United States Patent
Zhang et al.

(10) Patent No.: US 11,200,070 B2
(45) Date of Patent: Dec. 14, 2021

(54) DYNAMIC-LINK LIBRARY USAGE BASED ON MEMORY SIZE

(71) Applicant: International Business Machines Corporation, Armonk, NY (US)

(72) Inventors: Bao Zhang, Beijing (CN); Jing Lu, Beijing (CN); Jin Hong Fu, Beijing (CN); Shi Chong Ma, Beijing (CN); Xiao Ling Chen, Beijing (CN); Yuk L. Chan, Rochester, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/054,693

(22) Filed: Aug. 3, 2018

(65) Prior Publication Data

US 2020/0042331 A1  Feb. 6, 2020

(51) Int. Cl.
*G06F 9/445* (2018.01)
*G06F 8/41* (2018.01)
*G06F 8/54* (2018.01)
*G06F 16/901* (2019.01)

(52) U.S. Cl.
CPC .......... *G06F 9/44521* (2013.01); *G06F 8/433* (2013.01); *G06F 8/54* (2013.01); *G06F 9/44563* (2013.01); *G06F 16/9024* (2019.01)

(58) Field of Classification Search
None
See application file for complete search history.

(56) References Cited

U.S. PATENT DOCUMENTS

| | | | |
|---|---|---|---|
| 6,003,095 A | 12/1999 | Pekowski et al. | |
| 6,421,827 B1 | 7/2002 | Dimpsey | |
| 6,629,111 B1 * | 9/2003 | Stine | |
| 7,890,944 B2 | 2/2011 | Chou et al. | |
| 8,407,676 B2 | 3/2013 | Jansseune | |
| 8,443,343 B2 | 5/2013 | Blomstedt et al. | |

(Continued)

FOREIGN PATENT DOCUMENTS

| | | |
|---|---|---|
| CA | 2102883 A1 | 8/1994 |
| CN | 101826014 B | 5/2013 |

(Continued)

OTHER PUBLICATIONS

Bacon et al., "Fast Static Analysis of C++ Virtual Function Calls," OOPSLA '96: Proceedings of the 11th ACM SIGPLAN Conference on Object-Oriented Programming, Systems, Language, and Applications, Oct. 1996, vol. 31, No. 10, pp. 324-341. DOI: 10.1145/236337.236371.

(Continued)

*Primary Examiner* — Syed A Roni
(74) *Attorney, Agent, or Firm* — Nathan M. Rau

(57) ABSTRACT

Aspects of the present disclosure are directed to methods, systems, and computer program products for using dynamic-link library based on memory size. In the method, a request for calling a first function in a Dynamic-link library (DLL) at runtime is received first. A size of a memory allocated to the DLL is then determined. Then call relationship of functions in the DLL is obtained. At last, functions related to the first function in the DLL are loaded into the memory allocated to the DLL based on the size of the memory allocated to the DLL and call relationship of functions in the DLL.

17 Claims, 10 Drawing Sheets

(56) References Cited

U.S. PATENT DOCUMENTS

| | | | |
|---|---|---|---|
| 8,566,372 | B2 | 10/2013 | He et al. |
| 8,707,283 | B2 | 4/2014 | Jung et al. |
| 9,098,316 | B2 | 8/2015 | Comer et al. |
| 9,239,716 | B1 | 1/2016 | Allen |
| 9,424,006 | B2 | 8/2016 | Abadi et al. |
| 2004/0123308 | A1 | 6/2004 | Idoni |
| 2006/0026584 | A1 | 2/2006 | Muratori et al. |
| 2007/0162903 | A1 | 7/2007 | Babb et al. |
| 2008/0196017 | A1* | 4/2008 | Ritzau |
| 2008/0196012 | A1 | 8/2008 | Cohen et al. |
| 2008/0301719 | A1* | 12/2008 | Roberts |
| 2017/0161038 | A1 | 6/2017 | Ottoni |
| 2017/0161040 | A1 | 6/2017 | Chen et al. |
| 2017/0277551 | A1* | 9/2017 | Nicholson et al. |

FOREIGN PATENT DOCUMENTS

| | | |
|---|---|---|
| EP | 0533813 B1 | 3/1998 |
| WO | 2009083732 A1 | 7/2009 |

OTHER PUBLICATIONS

Grove et al., "A Framework for Call Graph Construction Algorithms," ACM Transactions on Programming Languages and Systems (TOPLAS), Nov. 2001, vol. 23, No. 6, pp. 685-746. DOI: 10.1145/506315.506316.

Ki et al., "A Novel Approach to Detect Malware Based on API Call Sequence Analysis," Research Article, International Journal of Distributed Sensor Networks, Jun. 1, 2015, vol. 2015, Article ID 659101, pp. 1-9. http://dx.doi.org/10.1155/2015/659101.

Srivastava, "Unreachable Procedures in Object-oriented Programming", WRL Research Report 93/4, Aug. 1993, 21 pgs.

Tip et al., "Scalable Propagation-based Call Graph Construction Algorithms," In Proceedings of OOPSLA'00, ACM conference on Object-Oriented Programming Systems, Languages, and Applications, pp. 281-293, 2000.

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

DYNAMIC-LINK LIBRARY USAGE BASED ON MEMORY SIZE

BACKGROUND

The present disclosure relates to the field of computer program running, and more specifically, to methods, systems and computer program products for using dynamic-link library based on memory size.

Dynamic-link library, also known as DLL, is used widely for implementing the shared library concept at runtime of a computer program. A DLL is usually composed of code, data, and resources, in any combination. It provides a mechanism for sharing code and data, allowing a developer of shared code/data/resources to upgrade functionalities without requiring applications to be re-compiled or re-linked.

SUMMARY

Aspects of the present disclosure are directed to methods, systems, and computer program products for using dynamic-link library based on memory size.

According to an aspect of the present disclosure, a method is provided. In the method, a request for calling a first function in a Dynamic-link library (DLL) at runtime is received first. A size of a memory allocated to the DLL is then determined. Then call relationship of functions in the DLL is obtained. At last, functions related to the first function in the DLL are loaded into the memory allocated to the DLL based on the size of the memory allocated to the DLL and the call relationship of functions in the DLL.

According to an aspect of the present disclosure, a computer system is provided. The computer system may include one or more computer processors, one or more computer-readable storage media, and program instructions stored on one or more of the computer-readable storage media for execution by at least one of the one or more computer processors. The program instructions may be executed to perform the disclosed method.

According to an aspect of the present disclosure, a computer program product is provided. The computer program product may include one or more computer-readable storage devices and program instructions stored on at least one of the one or more computer-readable storage devices for execution by at least one or more computer processors of a computer system. The program instructions may be executed by the at least one or more computer processors of the computer system to perform the disclosed method.

It is to be understood that the summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

Figure 1:
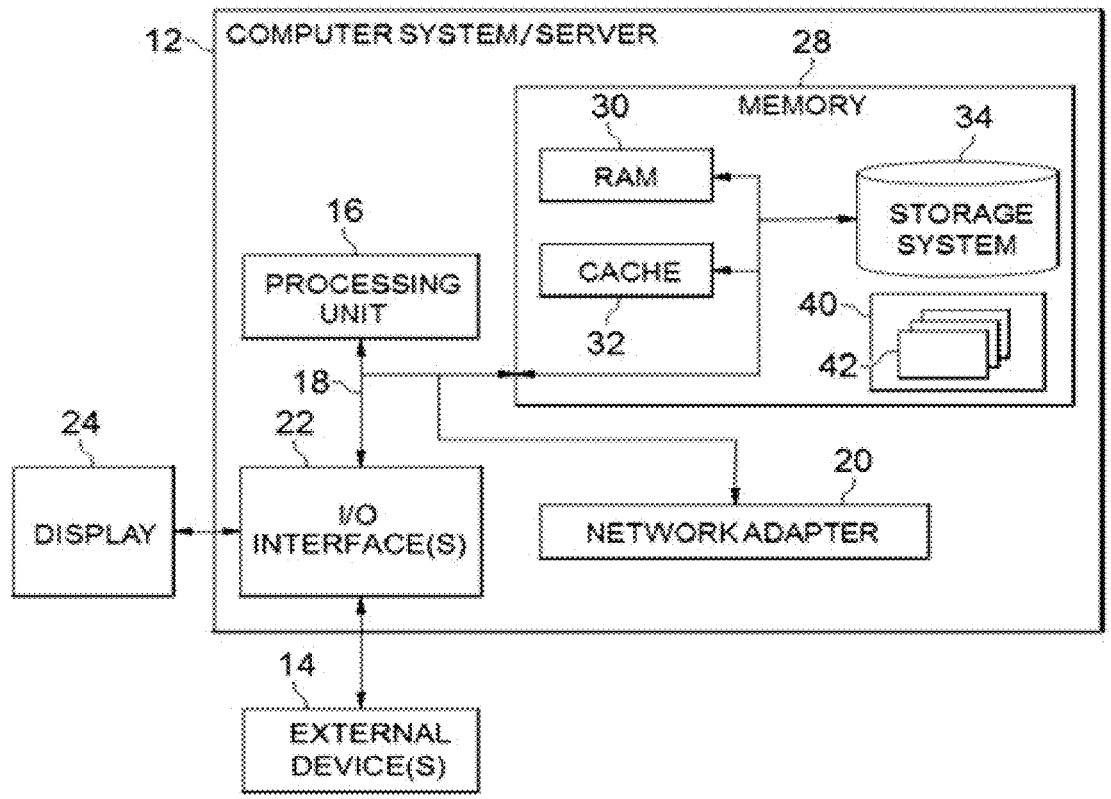
FIG. 1 depicts a cloud computing node according to an embodiment of the present disclosure.

The drawings are merely schematic representations, not intended to portray specific parameters of the disclosure. The drawings are intended to depict only typical embodiments of the disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the interest of not obscuring the presentation of embodiments of the present disclosure, in the following detailed description, some processing steps or operations that are known in the art may have been combined together for presentation and for illustration purposes and in some instances, may have not been described in detail. In other instances, some processing steps or operations that are known in the art may not be described at all. It should be understood that the following description is rather focused on the distinctive features or elements of various embodiments of the present disclosure.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
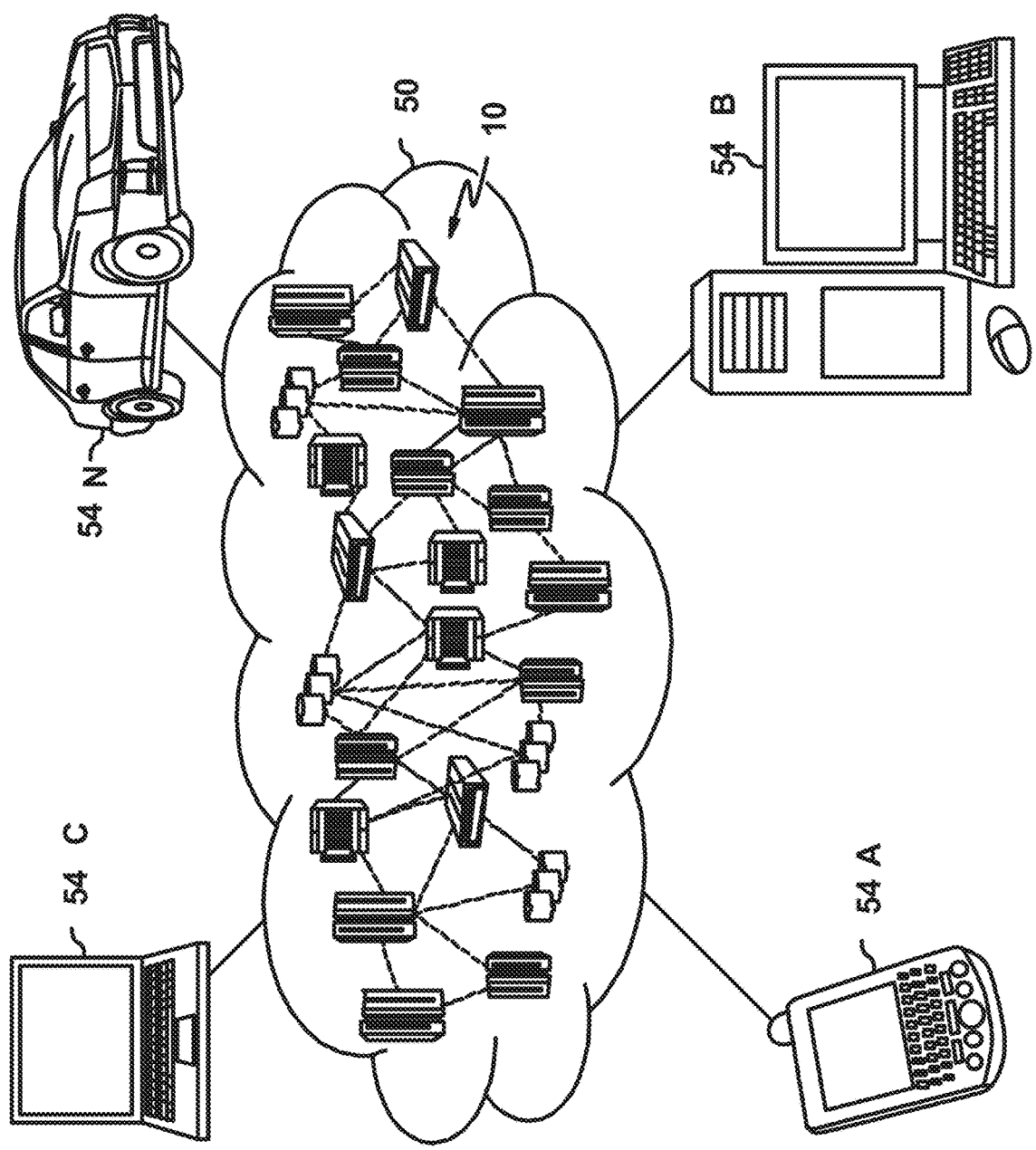
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
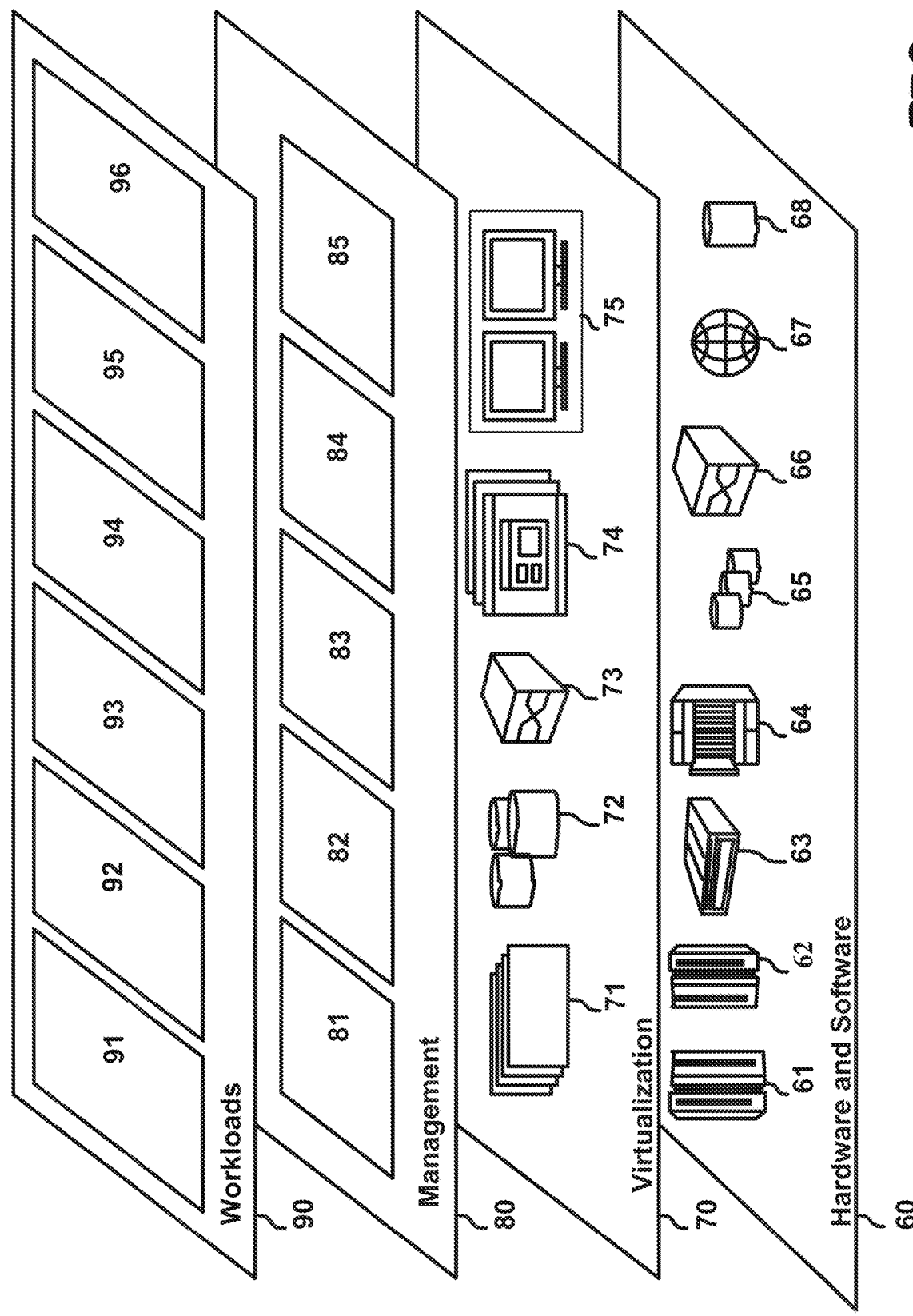
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and DLL usage 96 in this disclosure.

There are a plurality of binary files in a DLL, which contain code, data, and resources, in any composition. The code in the DLL, which can be exported as functions (also know as routines, programs, or procedures, and the like), is usually used by multiple processes and each function is identified by a numeric ordinal or by a name. If functions in the DLL are loaded by the numeric ordinal, a numeric ordinal represents a position of a function's address pointer in the DLL export table. And if the functions in the DLL are imported by their name, the functions in the DLL export table are listed by their name.

Then a user's program may link against an imported DLL to allow delayed loading of the DLL. In such case the operating system does not try to find or load the DLL when the user's program starts; instead, a stub, which is included in the user's program in one or more processors tries to find and load the DLL when one function in the DLL is called at runtime. Thus all functions in the DLL may be explicitly loaded by using lazy loading technology into the allocated memory space and be executed at run-time.

Figure 4:
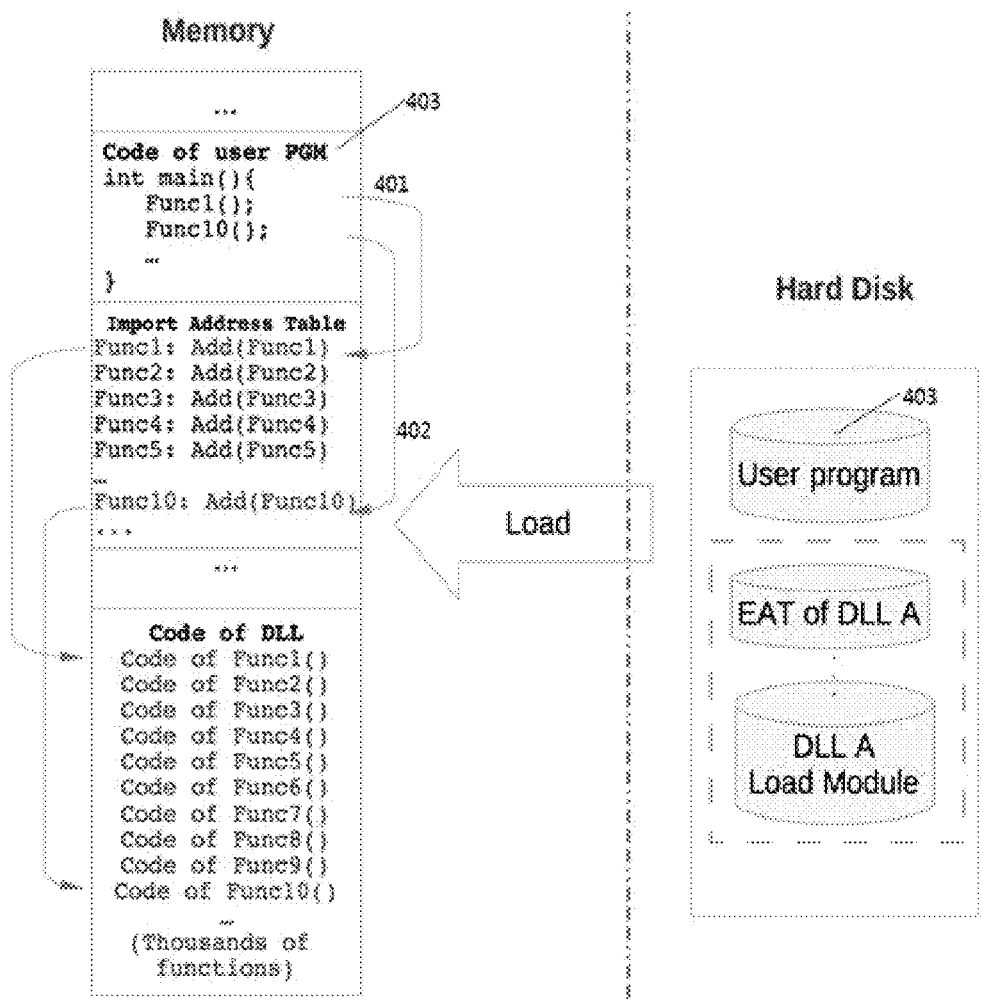
FIG. 4 shows an example of a DLL and a user's program calling the DLL.

However, a DLL, such as C runtime libraries provided by the operation system, is becoming more and more complex and huge in order to provide a large quantity of complex functionalities. During delayed loading, all binary files and necessary complied files, such as the DLL export table of the DLL itself, can be loaded into the memory while only several functions in the DLL are to be executed. This causes a significant memory cost. FIG. 4 shows an example of a DLL and a user's program calling the DLL. Referring to FIG. 4, only two functions, e.g. Func1( ) (401) and Func10( ) (402), are used by the user program 403. However, thousands of functions in the DLL are loaded into the memory. It can be found that there is significant overhead due to both the memory cost for the un-used functions and CPU cost to resolve the addresses of the un-used functions. In addition, if a size of the memory allocated to the DLL is not big enough to load the files in the DLL, the system may have a problem of excessive memory consumption.

A DLL in practice is logically composed by sub-components. Each of the sub-components is maximally self-contained and their inter-dependency is weak. For example, some functions are much closer to each other than the rest sub-components, and they together form an independent sub-component to realize a certain functionality such as initialization, heap management, or just business logic. A call graph can be used to represent a calling relationship between any two functions in the DLL.

This disclosure discloses a new method to load the DLL, which can make the DLL virtually sliceable by employing the information from the call relationship of functions in the DLL, and only some deserved entries of the call relationship of functions in the DLL are loaded into the memory when executing.

Figure 5:
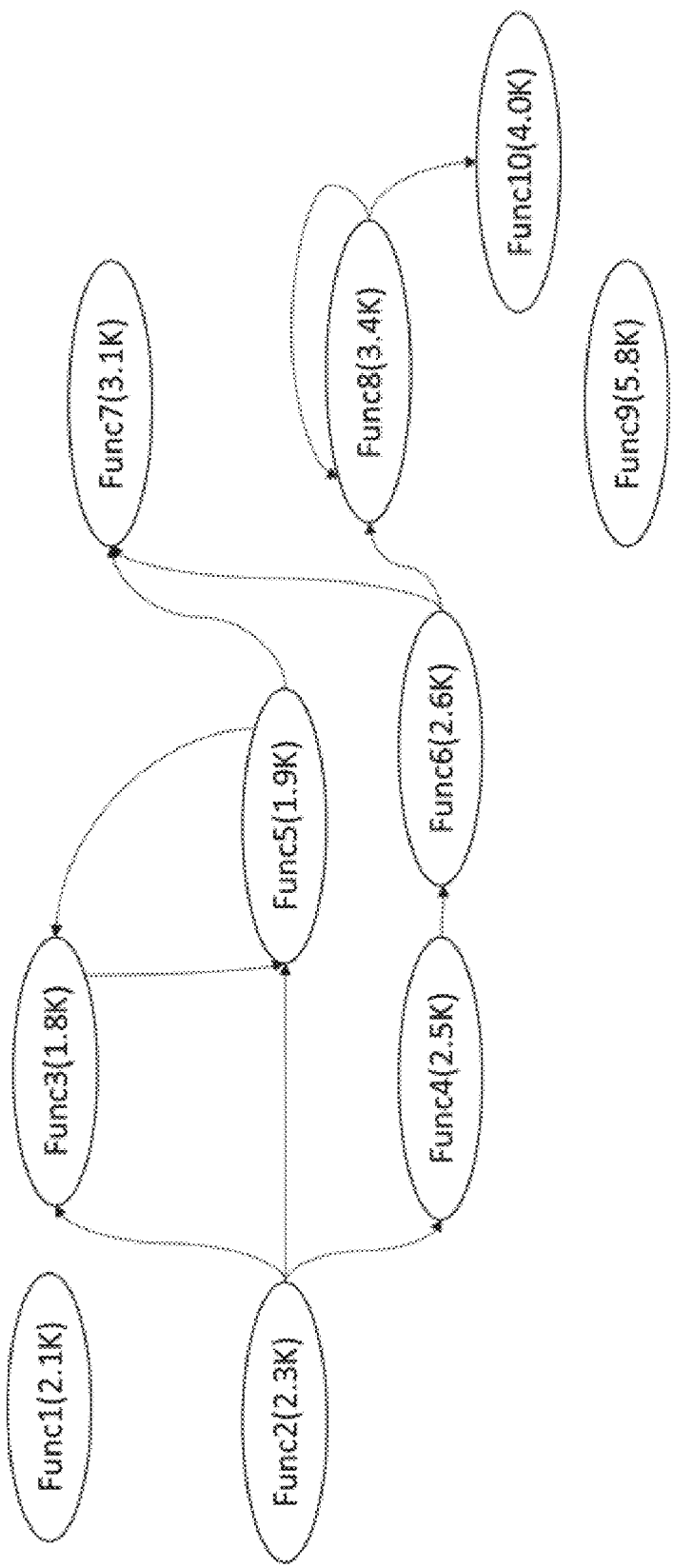
FIG. 5 shows an exemplary function call graph in a DLL according to an embodiment of the present disclosure.

In some embodiments, the call relationship of functions in a DLL is expressed by a directed graph, named as function call graph in this disclosure. FIG. 5 shows an exemplary function call graph in a DLL according to an embodiment of the present disclosure. And in this disclosure, a distance between a first node and a second node is defined as a count of the edge(s) along a shortest path in all paths between the first node and the second node in the directed graph. Referring to FIG. 5, a node represents a function in the DLL and a directed edge from a start node to an end node indicates that a function in the DLL represented by the start node calls a function in the DLL represented by the end node. A cycle in the graph, for example, function 5 in FIG. 5, indicates a recursive function call. Optionally, a size of function is defined as a size of the memory needed by the function once the function is loaded into the memory at run time, and the size of each function can be saved into each corresponding node. For example, the size of function 1-10 are 2.1K, 2.3K, 1.8K, 2.5K, 1.9K, 2.6K, 3.1K, 3.4K, 5.8K and 4.0K bytes respectively. Then the size of the memory needed by the DLL is 29.5K bytes. And the size of the functions in the DLL to be called directly or indirectly by function 2 together with the size of function 2 is 21.6K bytes. Those skilled in the art can understand that the above size is just for example, the actual size of a function or a DLL can be different. It can be understood that the call relationship of functions can be a pointer, or a linked list, and the like in some embodiments. To simplify the description, the function call graph is used to describe the call relationship of functions in the DLL.

From the call relationship of functions, it can be understood that some functions may have a call relationship, some may not. For example, function 1 and function 9 in FIG. 5 are stand-alone functions which have no call relationship with other functions, and function 7 and function 10 are only to be called by other functions, they do not call other functions; while function 2 calls functions 3-8 and function 10 directly or indirectly, function 3 calls function 5 and function 7 directly or indirectly; function 4 calls functions 6-8 and function 10 directly or indirectly; function 5 calls function 7 and function 3 directly; function 6 calls functions 7-8 and function 10 directly or indirectly; function 8 calls function 10 and itself directly. The function call graph can be stored in any data structure, such as an adjacency list, a tree, a matrix, and the like. The function call graph can be stored as a certain segment within the DLL, or together with the DLL export table, or in a separate file, in any file format, such as a txt file, an XML file or the like.

If a first function in the above DLL is called by the user's program at runtime, there is no need to load all functions in the DLL into memory. Instead, only some necessary functions, e.g. the functions to be called directly or indirectly by the first function together with the first function, are needed to be loaded into the memory. This disclosure, based on the above idea, can help a large DLL to be used within a limited memory space automatically.

The call relationship of functions can be provided directly by the DLL vendor, for example a file of the call relationship of functions is directly provided together with the DLL files by the DLL vendor. In an implementation, a compiler in the vendor can compile source code of the DLL to get the call relationship of functions. In another implementation, the developers in the vendor can build the call relationship of functions during coding. How to get the call relationship of functions from the source code of the DLL is the existing technology. For example, following technologies can be used to get the function call graph, such as Inter Procedural Class Analysis Fast Static Analysis, Reachability Analysis, and the like. The detailed implementation is omitted in this description accordingly. In another implementation, the call graph can be generated dynamically by recording the execution of the user's program.

Figure 6:
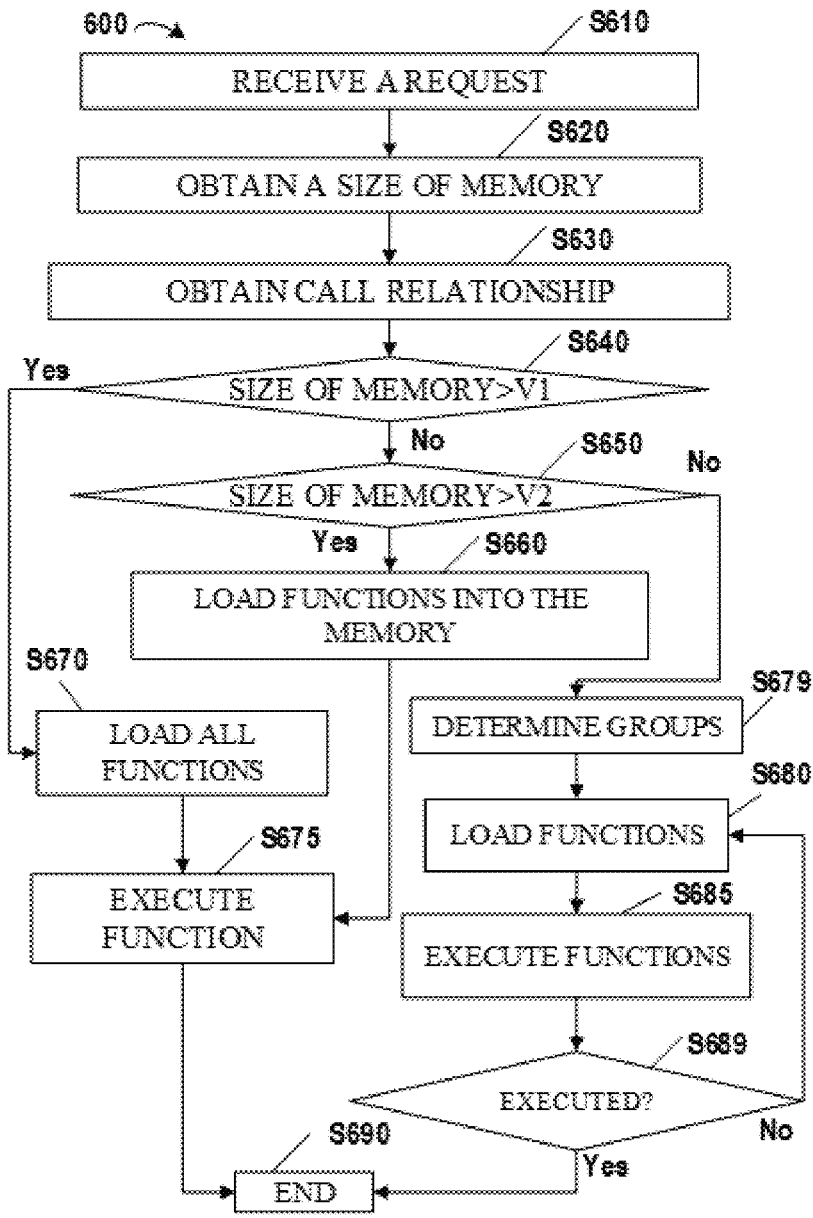
FIG. 6 depicts a flowchart of method 600 depicting operational steps for a DLL usage based on a size of the memory allocated to the DLL according to an embodiment of the present disclosure.

Referring to FIG. 6, which is a flowchart of method 600 depicting operational steps for a DLL usage based on the size of the memory allocated to the DLL in accordance with an embodiment of the present disclosure. At step S610, the process may begin when a processor receives a request for calling a first function in a DLL at runtime. The request may be from the user's program at runtime. At step S620, the processor may determine a size of the memory allocated to the DLL. It is possible that there are many user's programs running on operation system, which may allocate limited memory space to each user's program's DLL. At step S630, the processor may obtain call relationship of functions in the DLL from the hard disk or any other storage, such as from a cloud storage. And based on the size of the memory allocated to the DLL and the call relationship of functions in the DLL, the processor may load functions related to the first function in the DLL into the memory allocated to the DLL. In some embodiments, the size of the memory allocated to the DLL can be specified by the user. While in some embodiments, the size of the memory allocated to the DLL can be calculated dynamically according to the current memory status. And in some embodiments, the size of the memory allocated to the DLL can be determined by tuning with a memory cost and a time cost, with any mathematic methods.

In some embodiments, continuing with FIG. 6, at step S640, the processor may determine whether the size of the memory allocated to the DLL is greater than a first value. If it is determined that the size of the memory allocated to the DLL is greater than the first value, the process may go to step S670 in which all functions in the DLL may be loaded into the memory by the processor, the first function can be executed conventionally at step S675 and then at step S690, the process is ended. In some embodiments, the first value in this disclosure may be determined based on the size of all functions in the DLL, for example, the first value in FIG. 5 can be set to 30K bytes, or any other value more than 29.5K bytes. In some embodiments, the first value can be specified by the user. In some embodiments, the first value can be calculated dynamically according to the current memory status. In some embodiments, the first value can be determined by tuning with the memory cost and the time cost, with any mathematic methods.

In some embodiments, continuing with FIG. 6, if it is determined that the size of the memory allocated to the DLL is not greater than the first value, at step S650, the processor may further determine that whether the size of the memory allocated to the DLL is greater than a second value. The second value in this disclosure is determined based on a size of all functions in the DLL to be called directly or indirectly by the first function together with the size of the first function. For example, the second value in FIG. 5 can be set to 23K bytes, or any other value more than 21.6K bytes because if function 2 is called, the needed memory space is 21.6K bytes, which is the greatest memory space needed. The second value is less than the first value. In some embodiments, the second value can be specified by the user. In some embodiments, the second value can be calculated dynamically according to the current memory status. In some embodiments, the second value can be determined by tuning with the memory cost and the time cost, with any mathematic methods. If it is determined that the size of the memory allocated to the DLL is greater than the second value but not greater than the first value, at step S660, the processor may load all functions in the DLL to be called directly or indirectly by the first function together with the first function into the memory allocated to the DLL. For example, if function 2 in FIG. 5 is called by the user's program, the first value is 30K byte, the second value is 22K bytes, and the size of the memory allocated to the DLL is 25K bytes, then processor may load functions 2-8 and function 10 into the memory allocated to the DLL. The processor can get these functions address by their function name or by ordinal conventionally so as to load these functions. It can be found that function 1 and function 10 have not been loaded into the memory, which results in memory requirement reduction for the DLL. The method is especially helpful for a large DLL to be used within limited memory space. After loading, the process may go to step 675 in which the first function may be executed by the processor.

In some embodiments, continuing with FIG. 6, if it is determined that the size of the memory allocated to the DLL is less than or equal to the second value at step S650, then the processor may first determine function groups at step S679. Here functions to be called directly or indirectly by the first function together with the first function can be divided into the function groups in a group sequence. And a size of the memory needed by each of the function groups is less than the size of the memory allocated to the DLL. The processor then may first load a first group based on the group sequence including a part of functions to be called directly or indirectly by the first function together with the first function into the memory allocated to the DLL at step S680, and run the loaded functions at step S685. And then the processor can load another part of functions in a second group based on the group sequence and run the loaded functions and so on until the first function finishes running. In other words, the processor determines whether all functions related to the first function have been loaded into the memory group by group based on the group sequence, and have been executed function by function at step S689. If yes, the process is ended at step S690, otherwise, the processor may continue to load functions and execute functions at step S680 and step S689.

Ordinarily, a function in a DLL is executed based on conditions, for example, different values condition of a specific variable, and the like, to call several other functions in the DLL, which results in that the functions to be called directly or indirectly by the first function can not be grouped randomly. For example, if groups for the functions in FIG. 5 are set to group 1: {function 2, function 5, function 8}; group 2: {function 3, function 6}; and group 3: {function 4, function 7, function 10}. If function 2 is called by the user's program, the groups are called sequentially according to respective group number. It is not a good group solution because it is likely that function 2 calls function 4 in group 3 in accordance with the internal condition of function 2, but the processor may load group 1 first, then group 2 and group 3 at last, which may need more time to running function 2 completely. Therefore, how to group functions in the DLL may affect the execution efficiency of a function in the DLL.

In some embodiments, the functions in the DLL, to be called directly or indirectly by the first function, can be divided into groups based on a distance between the node of each function and the node of the first function in the function call graph if the size of the memory needed by each group is not greater than the size of memory allocated to the DLL. The nodes within a predefined distance from the node of the first function in the directed graph can be determined by any directed graph algorithm, for example, the depth-first search algorithm, the breadth-first search algorithm, and the like, which are the fundamentally digraph-processing algorithms in graph theory.

Figure 7:
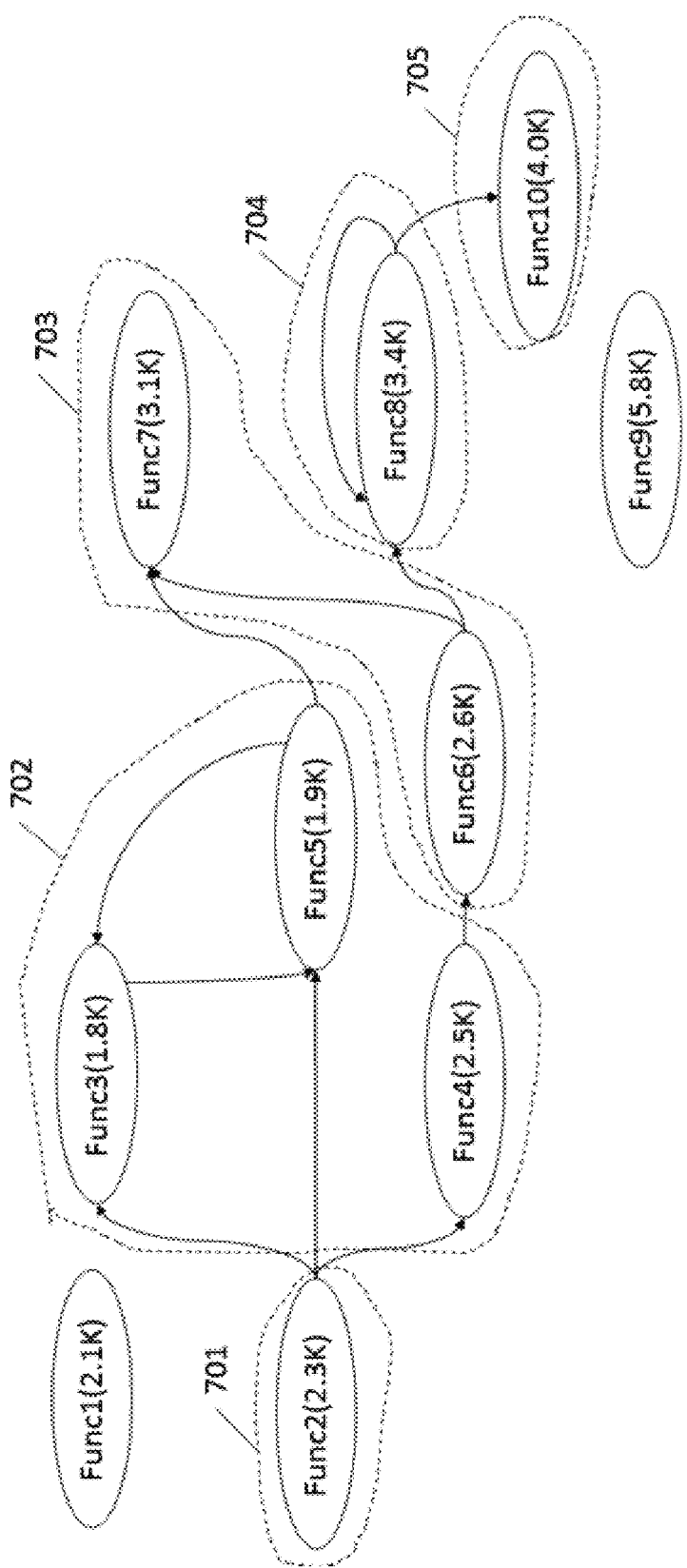
FIG. 7 shows a first grouping solution for the function call graph in FIG. 5 according to an embodiment of the present disclosure.

In some embodiments, the function(s) whose corresponding node(s) has a predefined distance from the node corresponding to the first function in the function call graph may be in the same group. For example, if the first function is function 2, and the size of the memory allocated to the DLL is 10K bytes, then the distances of functions 2-8 and function 10 are 0, 1, 1, 1, 2, 2, 3, 4 respectively. FIG. 7 shows a first grouping solution for the graph in FIG. 5 according to an embodiment of the present disclosure, in which the groups can be group 1, shown as 701 with the group size 2.3K bytes comprising function 2; group 2 shown as 702 with the group size 6.2K bytes comprising functions 3-5; group 3, shown as 703 with the group size 5.7K bytes comprising functions 6-7; group 4, shown as 704 with the group size 3.4K comprising function 8, and group 5, shown as 705 with the group size 4.0K bytes comprising function 10. In this way, if function 2 is called by the user's program, functions in group 0 can be loaded into memory first, then functions in group 1 are loaded into the memory, function 5 is called by function 2 for example, and then functions in group 2 are loaded into the memory, function 7 is called by function 5 for example. By this time, function 2 is executed completely.

Figure 8:
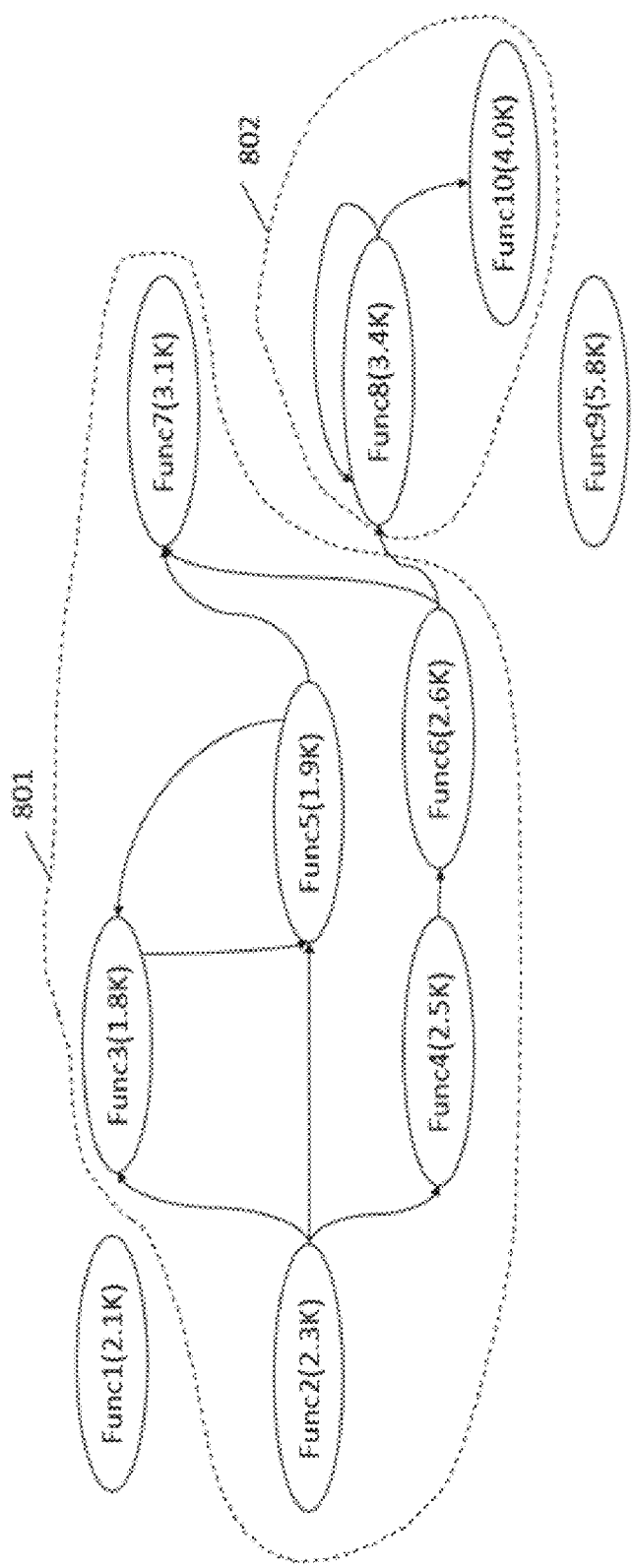
FIG. 8 shows a second grouping solution for the function call graph in FIG. 5 according to an embodiment of the present disclosure.

In some further embodiments, the size of the memory allocated to the DLL is a little less than the second value 22K bytes, such as 15K bytes, the function(s) whose corresponding node(s) are within a predefined distance(s) from the node corresponding to the first function in the function call graph can be in the same group. Referring to FIG. 8 which shows a second grouping solution for the graph in FIG. 5 according to an embodiment of the present disclosure, the groups can be group 1, shown as 801 with the group size 14.2K bytes comprising functions 2-7 whose distances are less than 4; group 2 shown as 802 with group size 7.4K bytes comprising function 8 and function 10. Hence, if function 2 is called by the user's program, functions in group 1 can be loaded into memory first, function 2 is called first then function 5 and function 7 are called in order. In this way, function 2 is executed completely.

The above static grouping methods, in some embodiments, may be used stand-alone. While in some embodiments, the above static grouping methods may be integrated within a loader, within a runtime, or within an operating system. In some embodiments, the above static grouping methods may be provided by the DLL vendors as a stub or in any other formats. It can be understood that a plurality of grouping results may be provided directly instead of the plurality of static grouping methods.

Figure 9:
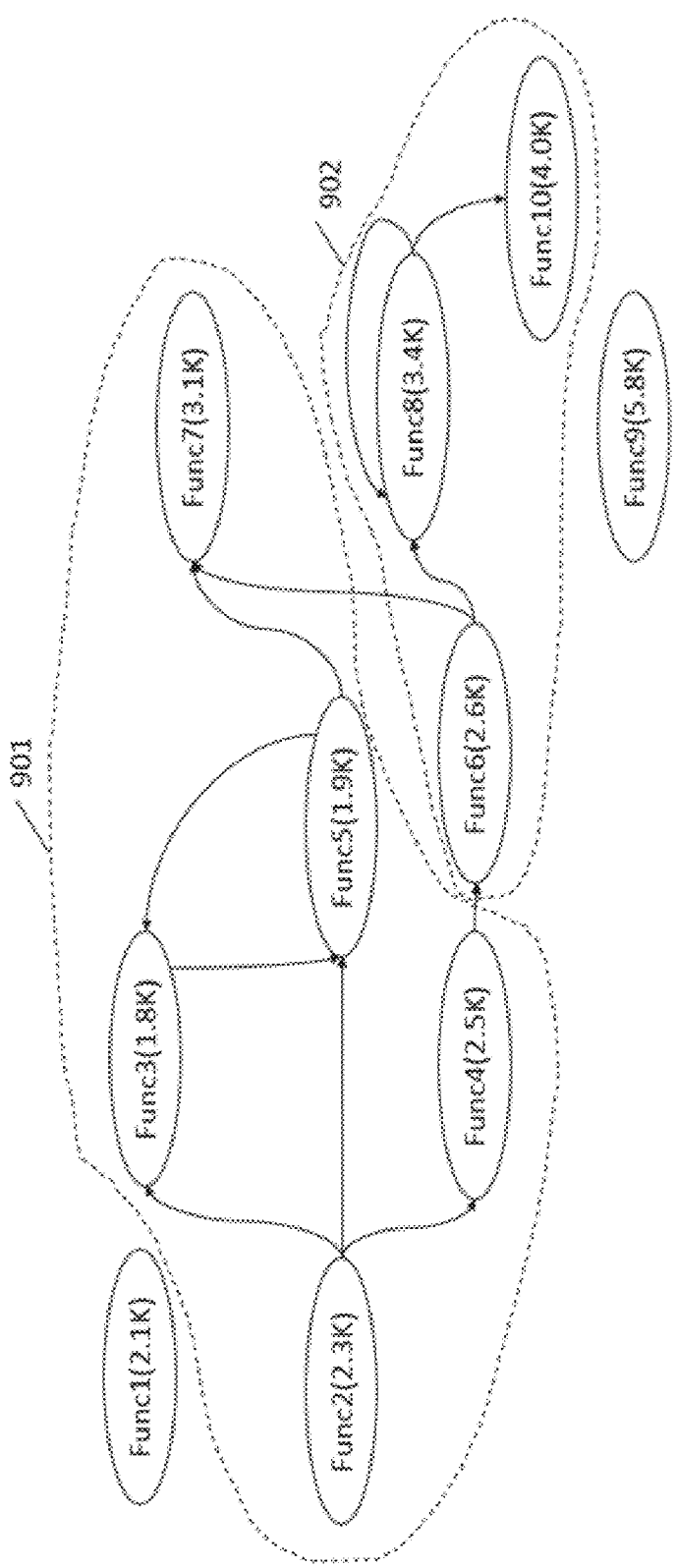
FIG. 9 shows a third grouping solution for the function call graph in FIG. 5 according to an embodiment of the present disclosure.

In some embodiments, the functions related to the first function can be sorted based on the distance between the node of each of the functions and the node of the first function in the function call graph. The less the distance between the node of the function and the node of the first function is, the smaller the function's group order is, relative to other functions in the DLL to be called directly or indirectly by the first function. While if the distances between each node of several functions and the node of the first function are the same, the several functions order can be randomly changed. For example, functions 3-9 and function 10 can be sorted as {{function 2}, {function 3, function 4, function 5}, {function 6, function 7}, {function 8}, {function 10}}, in other words, the sorted order can be {function 2, function 3, function 4, function 5, function 6, function 7, function 8, function 10} or {function 2, function 4, function 5, function 3, function 7, function 6, function 8, function 10}. Then the size of each function is accumulated based on the order, if an accumulative size value is closest to the size of the memory allocated to the DLL, the functions involved in the accumulating step may be in a same group. Then the rest functions in the DLL can be processed in the same way. FIG. 9 shows a third grouping solution for the function call graph in FIG. 5 according to an embodiment of the present disclosure. Referring to FIG. 9, suppose the sorted order is {function 2, function 4, function 5, function 3, function 7, function 6, function 8, function 10}, and the size of the memory allocated to the DLL is 12K bytes, then the size of first group can be added up as 2.3K(function 2)+2.5K (function 3)+1.9K(function 4)+1.8K (function 5)+3.1K (function 7)=11.6K<12K and it also can be found that 2.3K (function 2)+2.5K(function 3)+1.9K(function 4)+1.8K (function 5)+3.1K(function 7)+2.6K (function 6)=14.2K>12K, in other words, the size of functions to be called directly or indirectly by the first function together with the size of the first function are accumulated according to the function's order until the accumulative size value is closest to the size of the memory allocated to the DLL, then the functions involved in the accumulation comprises a function group. In this example, group 1, shown as 901, is {function 2, function 4, function 5, function 3, function 7} and group 2, shown as 902, is {function 6, function 8, function 10} (size:10K<12K). It can be found that if function 2 is called by the user's program, only functions in group 1 which include function 2, function 5 and function 7 are needed to be loaded into the memory.

Figure 10:
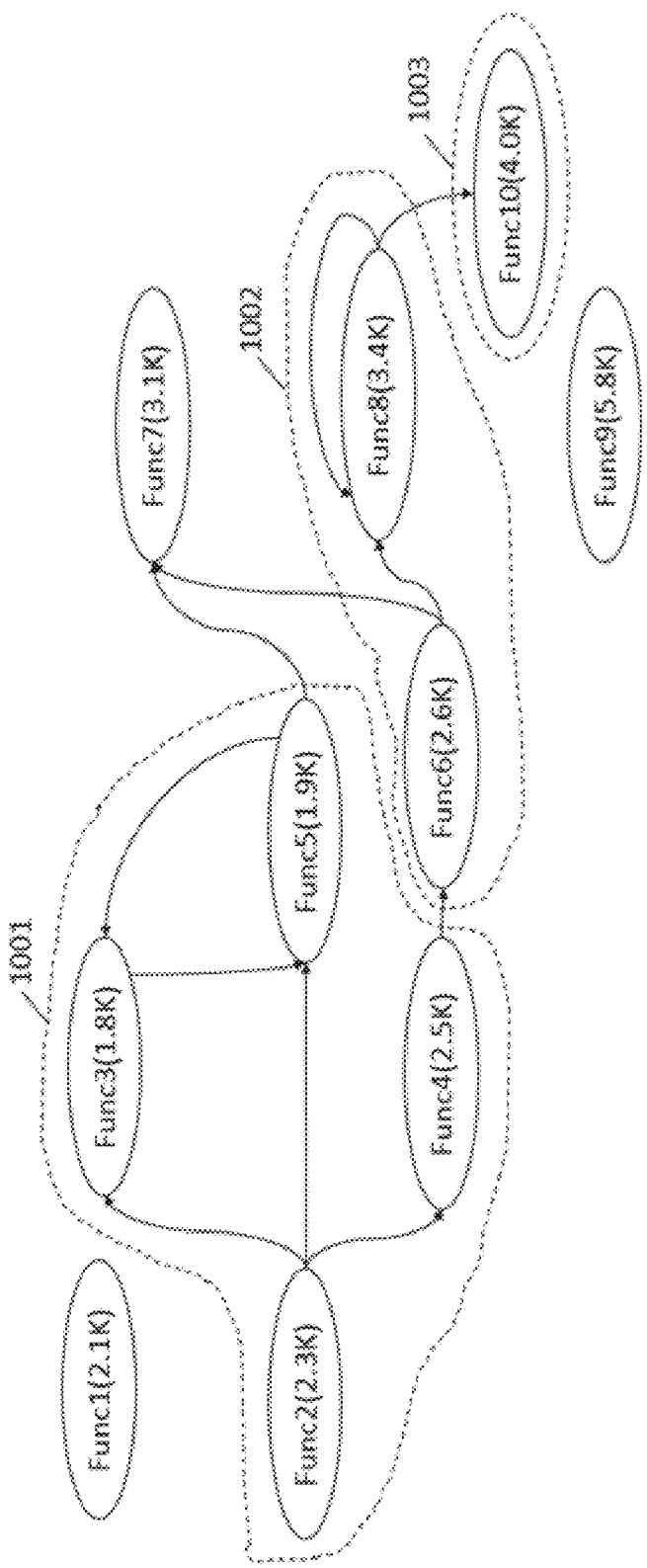
FIG. 10 shows a fourth grouping solution for the function call graph in FIG. 5 according to an embodiment of the present disclosure.

In some embodiments, the processor can dynamically determine the function groups according to the function call graph, an execution status of the user's program and the size of the memory allocated to the DLL. For example, still referring to FIG. 5, if the processor determines that the first function is function 2, the size of the memory allocated to the DLL is 9.0K, the processor can determine that group 1 includes functions 2-5 (2.3K+1.8K+1.9K+2.5K=8.5K) based on the method used in FIG. 9. After executing function 2 and function 4, the processor can determine the next function to be loaded into the memory is function 6 based on the execution status of the user's program. Then the processor can determine that group 2 includes function 6 and function 8 (2.6K+3.4K=6.0K), and group 3 includes function 10 (4.0K). FIG. 10 shows a forth grouping solution for the function call graph in FIG. 5 according to an embodiment of the present disclosure, in which the determined group 1, shown as 1001 with the group size 8.5K bytes comprising functions 2-5, group 2 shown as 1002 with the group size 6K bytes comprising function 6 and function 8; and group 3, shown as 1003 with the group size 4.0K bytes comprising function 10.

The above methods can be regarded as dynamic grouping methods, for the functions to be loaded into memory is calculated according to the current running status of the program, the function call graph and the size of the memory allocated to the DLL. That is, for different programs using the same DLL, for different running status of the same user's program using the same DLL, and for different size of the memory allocated to the DLL of the same user's program using the same DLL, the functions loaded firstly into the memory may be different. The above dynamic grouping method can be called by an application program, by a run time library, by a loader, or by an operating system.

Using the above method 600, the memory cost for the DLL can be reduced, especially for the large DLL, thereby helping the traditional code to be transformed to mobile or embedded platforms with the limited memory space. This method also can be used in a performance tuning system. It also can be found that if the proper groups are used for one certain scenario in the user's program, only part of the DLL may be loaded into the memory, which may considerably improve the performance of the user's program, for the un-used functions do not need to be resolved.

While the above describes a particular order of operations performed by certain embodiments of the disclosure, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving, by one or more processors, a request for calling a first function in a Dynamic-link library (DLL) at runtime;
   obtaining, by the one or more processors, call relationship of functions in the DLL; and
   loading, by the one or more processors, functions related to the first function in the DLL into memory allocated to the DLL based on a size of memory allocated to the DLL and the call relationship of functions in the DLL,
   wherein the loading comprises, in response to the size of the memory allocated to the DLL being equal to or less than a second value:
   determining by the one or more processors, function groups, wherein functions to be called directly or indirectly by the first function(s) together with the first function are divided into the function groups in a group sequence, and
      wherein a size of the memory needed by each of the function groups is less than the size of the memory allocated to the DLL;
   loading, by the one or more processors, functions in a function group based on the group sequence from the function groups into the memory allocated to the DLL; and
   running, by the one or more processors, the loaded functions.

2. The method according to claim 1, wherein the loading comprises:
   in response to the size of the memory allocated to the DLL being equal to or less than a first value and greater than the second value, loading, by the one or more processors, all functions to be called directly or indirectly by the first function together with the first function.

3. The method according to claim 2, wherein the first value is based on a size of the memory needed by the DLL, and the second value is based on a size of the memory needed by the functions to be called directly or indirectly by the first function together with the size of the first function.

4. The method according to claim 1, wherein the call relationship of functions in the DLL is expressed by a directed graph, in which a node represents a function in the DLL and a directed edge from a start node to an end node indicates that a function in the DLL represented by the start node calls a function in the DLL represented by the end node, a distance between a first node and a second node is defined as a count of the edge(s) along a shortest path in all paths between the first node and the second node in the directed graph.

5. The method according to claim 4, wherein a function group of the function groups is defined as a group of function(s) whose corresponding node(s) are within a predefined distance from the node corresponding to the first function in the directed graph.

6. The method according to claim 4, wherein the determining function groups comprises:
   sorting, by the one or more processors, functions in the DLL to be called by the first function directly or indirectly in an ordered sequence based on a distance between the node of each of the functions and the node of the first function in the directed graph; and
   accumulating, by the one or more processors, a size of the memory needed by each of the functions to be called by directly or indirectly the first function according to the ordered sequence until an accumulative size value is closest to the size of the memory allocated to the DLL;
   wherein the function group comprises functions involved in the accumulating step.

7. The method according to claim 6, wherein the request is from a user's program, and the function group is obtained further based on an execution status of the user's program.

8. A computer system comprising: one or more computer processors, one or more computer-readable storage media, and program instructions stored on one or more of the computer-readable storage media for execution by at least one of the one or more computer processors, the program instructions, when executed by the at least one of the one or more computer processors, causing the computer system to perform a method comprising:
   receiving a request for calling a first function in a Dynamic-link library (DLL) at runtime;
   determining a size of a memory allocated to the DLL;
   obtaining call relationship of functions in the DLL; and
   loading functions related to the first function in the DLL into the memory allocated to the DLL based on the size of the memory allocated to the DLL and the call relationship of functions in the DLL
   wherein the loading comprises:
   in response to the size of the memory allocated to the DLL being equal to or less than a second value:
   determining function groups, wherein functions to be called directly or indirectly by the first function(s) together with the first function are divided into the function groups in a group sequence, and wherein a size of the memory needed by each of the function groups is less than the size of the memory allocated to the DLL;
   loading, by the one or more processors, functions in a function group based on the group sequence from the function groups into the memory allocated to the DLL; and
   running, by the one or more processors, the loaded functions.

9. The computer system according to claim 8, wherein the loading comprises:
   in response to the size of the memory allocated to the DLL being equal to or less than a first value and greater than the second value, loading all functions to be called directly or indirectly by the first function together with the first function.

10. The computer system according to claim 8, wherein the call relationship of functions in the DLL is expressed by a directed graph, in which a node represents a function in the DLL and a directed edge from a start node to an end node indicates that a function in the DLL represented by the start node calls a function in the DLL represented by the end node, a distance between a first node and a second node is defined as a count of the edge(s) along a shortest path in all paths between the first node and the second node in the directed graph.

11. The computer system according to claim 10, wherein a function group of the function groups is defined as a group of function(s) whose corresponding node(s) are within a predefined distance from the node corresponding to the first function in the directed graph.

12. The computer system according to claim 10, wherein the determining function groups comprises:
  sorting functions in the DLL to be called by the first function directly or indirectly in an ordered sequence based on a distance between the node of each of the functions and the node of the first function in the directed graph; and
  accumulating a size of the memory needed by each of the functions to be called by directly or indirectly the first function according to the ordered sequence until an accumulative size value is closest to the size of the memory allocated to the DLL;
  wherein the function group comprises functions involved in the accumulating step.

13. A computer program product comprising: one or more computer-readable storage media and program instructions stored on at least one of the one or more computer-readable storage media for execution by at least one or more computer processors of a computer system, the program instructions, when executed by the at least one of the one or more computer processors, causing the computer system to perform a method comprising:
  receiving a request for calling a first function in a Dynamic-link library (DLL) at runtime;
  obtaining call relationship of functions in the DLL; and
  loading functions related to the first function in the DLL into a memory allocated to the DLL based on a size of the memory allocated to the DLL and the call relationship of functions in the DLL
  wherein the loading comprises:
    in response to the size of the memory allocated to the DLL being equal to or less than a second value:
      determining function groups, wherein functions to be called directly or indirectly by the first function(s) together with the first function are divided into the function groups in a group sequence, and wherein a size of the memory needed by each of the function groups is less than the size of the memory allocated to the DLL;
    loading, by the one or more processors, functions in a function group based on the group sequence from the function groups into the memory allocated to the DLL; and
    running, by the one or more processors, the loaded functions.

14. The computer program product according to claim 13, wherein the loading comprises:
  in response to the size of the memory allocated to the DLL being equal to or less than a first value and greater than the second value, loading all functions to be called directly or indirectly by the first function together with the first function.

15. The computer program product according to claim 13, wherein the call relationship of functions in the DLL is expressed by a directed graph, in which a node represents a function in the DLL and a directed edge from a start node to an end node indicates that a function in the DLL represented by the start node calls a function in the DLL represented by the end node, a distance between a first node and a second node is defined as a count of the edge(s) along a shortest path in all paths between the first node and the second node in the directed graph.

16. The computer program product according to claim 15, wherein a function group of the function groups is defined as a group of function(s) whose corresponding node(s) are within a predefined distance from the node corresponding to the first function in the directed graph.

17. The computer program product according to claim 15, wherein the determining function groups comprises:
  sorting functions in the DLL to be called by the first function directly or indirectly in an ordered sequence based on a distance between the node of each of the functions and the node of the first function in the directed graph; and
  accumulating a size of the memory needed by each of the functions to be called by directly or indirectly the first function according to the ordered sequence until an accumulative size value is closest to the size of the memory allocated to the DLL;
  wherein the function group comprises functions involved in the accumulating step.

* * * * *